United States Patent [19]

Marimuthu

[11] Patent Number: 5,878,232

[45] Date of Patent: Mar. 2, 1999

[54] DYNAMIC RECONFIGURATION OF NETWORK DEVICE'S VIRTUAL LANS USING THE ROOT IDENTIFIERS AND ROOT PORTS DETERMINED BY A SPANNING TREE PROCEDURE

[75] Inventor: Peram Marimuthu, Harris County, Tex.

[73] Assignee: Compaq Computer Corporation, Houston, Tex.

[21] Appl. No.: 775,021

[22] Filed: Dec. 27, 1996

[51] Int. Cl.[6] .......................... G06F 15/163; H04L 12/46
[52] U.S. Cl. ................................. 395/200.79; 395/200.54
[58] Field of Search .................................. 370/254, 255, 370/256, 911; 395/200.79, 200.53, 200.54

[56] References Cited

U.S. PATENT DOCUMENTS

| | | | |
|---|---|---|---|
| 5,079,767 | 1/1992 | Perlman ................................... | 370/408 |
| 5,150,360 | 9/1992 | Perlman et al. ......................... | 370/402 |
| 5,309,437 | 5/1994 | Perlman et al. ......................... | 370/401 |
| 5,394,402 | 2/1995 | Ross ........................................ | 370/402 |
| 5,398,242 | 3/1995 | Perlman .................................. | 370/256 |
| 5,430,728 | 7/1995 | Narayanan et al. .................... | 370/404 |
| 5,490,252 | 2/1996 | Macera et al. ..................... | 395/200.79 |
| 5,511,168 | 4/1996 | Perlman et al. ................... | 395/200.73 |
| 5,606,669 | 2/1997 | Bertin et al. ....................... | 395/200.53 |
| 5,734,824 | 3/1998 | Choi .................................. | 395/200.54 |
| 5,742,604 | 4/1998 | Edsall ..................................... | 370/401 |
| 5,761,435 | 6/1998 | Fukuda et al. ..................... | 395/200.68 |
| 5,764,636 | 6/1998 | Edsall ..................................... | 370/401 |
| 5,790,808 | 8/1998 | Seaman .............................. | 395/200.53 |
| 5,825,772 | 10/1998 | Dobbins et al. ........................ | 370/396 |

*Primary Examiner*—Parshotam S. Lall
*Assistant Examiner*—Andrew Caldwell
*Attorney, Agent, or Firm*—Akin, Gump, Strauss, Hauer & Feld, L.L.P.

[57] ABSTRACT

A system and method of configuring VLANs of a multiple port bridging device by merging potentially conflicting VLANs. One or more VLANs are first defined by the user, and equivalent and subset VLANs are merged. The spanning tree procedure is then performed to determine a root identifier and a root port for each VLAN. The root identifier of each VLAN is compared with the other VLANs, and if equal, the root ports of the two VLANs are compared. If the root identifiers are the same and if the root ports are different for any two VLANs, the two VLANs are merged into a new VLAN. To merge two VLANs, all of the ports of both VLANs are combined to define a new VLAN. Preferably, each VLAN is compared with every other VLAN in this manner. The spanning tree procedure is then executed for the new VLAN, which is then compared to the other VLANs in the same manner. Furthermore, if the root identifiers and the root ports are equal, then it is determined if any shared port of the two VLANs is blocked for one and not the other. If so, the two VLANs are merged into a new VLAN.

14 Claims, 5 Drawing Sheets

DYNAMIC RECONFIGURATION OF NETWORK DEVICE'S VIRTUAL LANS USING THE ROOT IDENTIFIERS AND ROOT PORTS DETERMINED BY A SPANNING TREE PROCEDURE

FIELD OF THE INVENTION

The present invention relates generally to the field of networking devices, and more particularly to a system and method for method and apparatus for dynamically reconfiguring virtual LANs to obtain a functional spanning tree for efficient network operation.

DESCRIPTION OF THE RELATED ART

There are many different types of networks and network systems for sharing files and resources or for otherwise enabling communication between two or more computers. The term "network device" generally refers to a computer linked to a network via a network interface card (NIC), or to other devices that perform specialized functions in the network, such as repeaters or hubs, bridges, switches, routers and brouters, to name a few examples. Networks may be categorized based on various features and functions, such as message capacity, range over which nodes are distributed, node or computer types, node relationships, topology or logical and/or physical layout, architecture or structure based on cable type and data packet format, access possibilities, etc. For example, the range of a network refers to the distance over which nodes are distributed, such as local-area networks (LANS) within an office or floor of a building, wide-area networks (WANs) spanning across a college campus, or a city or a state and global-area networks (GANs) spanning across national boundaries.

A network may be expanded by using one or more repeaters, bridges, switches or similar type devices. A repeater is a device that moves all packets from one network segment to another by regenerating, re-timing, and amplifying the electrical signals. A bridge is a device that operates at the Data-Link Layer of the OSI (Open Systems Interconnection) Reference Model and passes packets from one network to another and increases efficiency by filtering packets to reduce the amount of unnecessary packet propagation on each network segment. A switch is a network device similar in function to a multiple port bridge, but includes a plurality of ports for coupling to several similar networks for directing network traffic among the networks. A repeater or a switch may also include a second set of ports for coupling to higher speed network devices, such as one or more uplink ports.

Expansion of a network often results in loops that cause undesired duplication and transmission of network packets, such as broadcast storms, as well as address conflict problems. A standard spanning tree procedure has been defined for network bridging devices, such as bridges, routers and switches, to enable the bridging devices of a network to dynamically discover a subset of any topology that forms a loop-free or "spanning" tree. A spanning tree procedure by the American National Standards Institute and the Institute of Electrical and Electronics Engineers, Inc is published in a specification known as the *ANSI/IEEE Std.* 802.1D. The spanning tree procedure results in a network path between any two devices in the network system, which is updated dynamically in response to modifications of the network system. Each bridging device transmits configuration messages, otherwise referred to as configuration bridge protocol data units (BPDUs), which are used by other bridging devices in the network to determine the spanning tree. The configuration messages used to determine the spanning tree are based on 48-bit media-access control (MAC) addresses, which, according to industry standards, are guaranteed to be unique. The bridging device having the lowest MAC address is selected as the root of the spanning tree, and the other bridging devices determine a cost, or distance away from, the root device.

Some bridging devices, such as multiple port bridges, switches, routers or the like include the capability for a user to define one or more virtual LANs (VLANs). Separate VLANs enable separate address space to be associated with each VLAN. The user or network administrator defines one or more VLANs by grouping one or more ports together in a VLAN definition, where the bridging device effectively separates each VLAN from the other ports. One or more ports may be shared among two or more VLANs, which causes traffic to flow between the VLANs with shared ports. Such shared ports are allowed, but may cause looping problems, address conflicts and/or broadcast storms. Also, the user may intentionally or inadvertently connect two or more ports of two mutually-exclusive VLANs together through external hardware forming an external loop. Such loops are not necessarily handled by the standard spanning tree procedure and may result in undesired packet duplication and transmission, address conflicts or broadcast storms.

It is desired to detect problematic links or loops in VLAN definitions and hardware connections, respectively, that would otherwise cause network problems and undermine the purpose of the spanning tree. It is further desired to modify the network configuration to result in a trouble-free and functional network system.

SUMMARY OF THE INVENTION

A method according to the present invention of configuring VLANs of a multiple port bridging device, includes steps of predefining a plurality of VLANs, performing the spanning tree procedure to determine a root identifier and a root port for each VLAN, comparing the root identifier of each VLAN with at least one other VLAN, and if the root identifier of any two VLANs are equal, comparing the root ports of the two VLANs, and if the root identifiers are the same and if the root ports are different for any two VLANs, merging the two VLANs into a new VLAN. Preferably, each VLAN is compared with every other VLAN in this manner. To merge the VLANs, all of the ports of both VLANs are combined to define the new VLAN. The spanning tree procedure is then executed for the new VLAN, which is then compared to the other VLANs in the same manner. Also, any predefined VLANs that are equivalent to each other are merged, and any subset VLANs are merged with larger VLANs that include all of the ports of the respective subset VLANs. If the root identifiers and the root ports are equal, a method according to the present invention may further include steps of determining if any shared port of the two VLANs is blocked for one and not the other, and if so, merging the two VLANs into a new VLAN.

A network device according to the present invention includes a plurality of ports, a VLAN definition circuit that defines a plurality of VLANs by grouping one or more of the ports, spanning tree circuitry that determines a spanning tree definition for each of the VLANs including determination of a root identifier and a root port, and processing circuitry that compares the spanning tree definition of the VLANs, and that merges any two VLANs if the root identifier of both are the same and if the root port of both of the two VLANs are not the same. The processing circuitry further merges two VLANs if the root identifier and the root port of both VLANs are the same and if a shared port is blocking for one and not blocking for the other. The processing circuitry merges VLANs by determining a new VLAN that includes all the ports of the merged VLANs. The circuitry of the network device, including the spanning tree circuitry, the processing circuitry and the VLAN definition circuit comprises a processor, memory and port circuitry coupled together in any desired and suitable fashion for performing the network functions.

It is appreciated that a method and apparatus for dynamically reconfiguring virtual LANs of a network device prevents network problems, such as looping data packets, address conflicts and/or broadcast storms, that would otherwise result from the given VLAN definition and/or the particular network configuration. Such VLAN merging prevents network problems intended to be addressed by the spanning tree procedure, but re-introduced with the VLAN definition or hardware configuration. Conflicts arising between any two VLANs not resolved by the standard spanning tree procedure are resolved by merging the VLANs into one and recalculating a spanning tree for the new VLAN. Such merging eliminates the potential problems to achieve a working network without introducing any new network problems. The management information base (MIB) may be extended to reflect the original VLAN definitions and the results of any VLAN mergers. A user or network administrator may reconfigure the VLANs or the hardware as desired.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
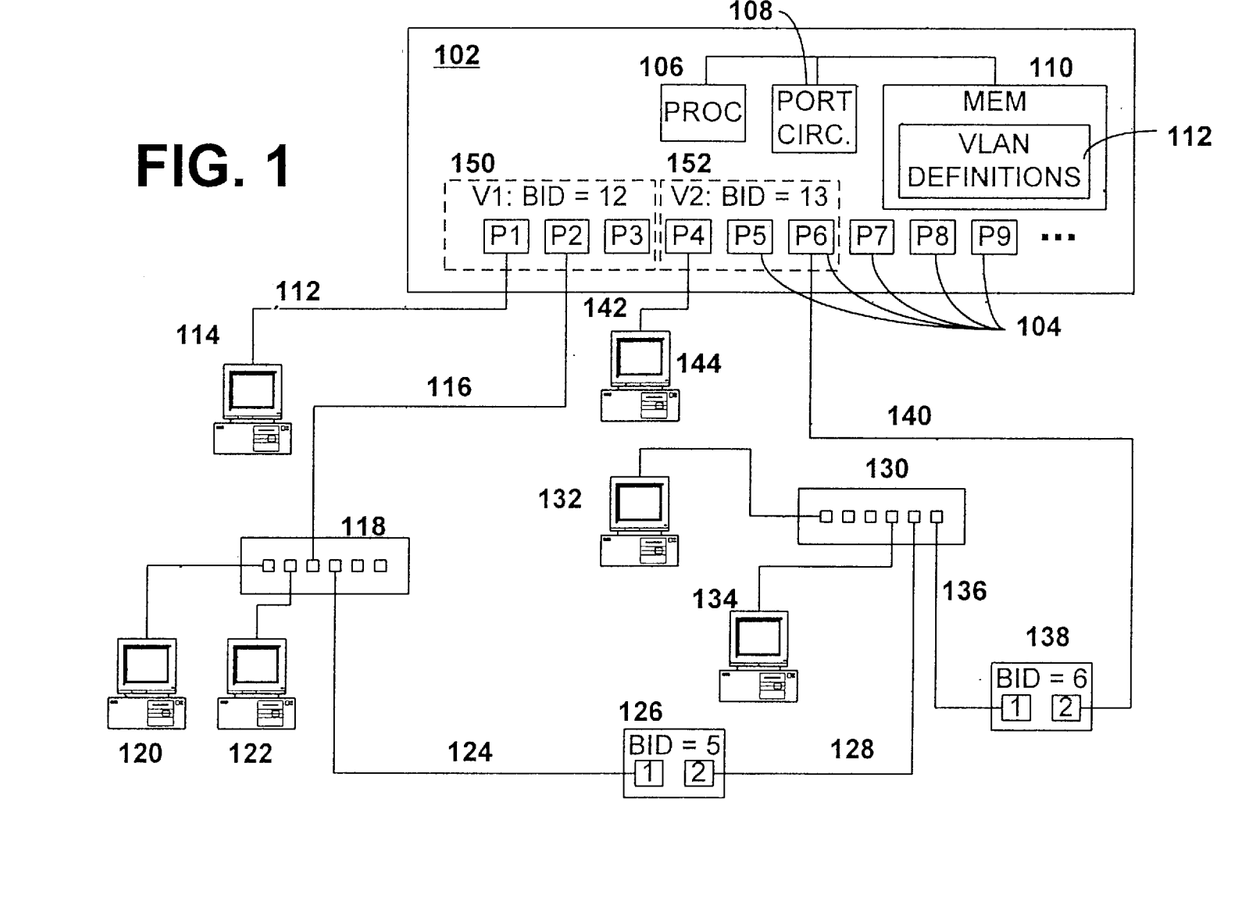
FIG. 1 is a block diagram illustrating a network system including a multiple port network device implemented according to the present invention.

Referring now to FIG. 1, a block diagram is shown of a network system 100 including a multiple port network device 102 implemented according to the present invention, which has a plurality of ports 104 labeled P1, P2, P3, ... Pn. The network device 102 may have as many ports 104 as desired, where each port 104 operates according to any type of network protocol, such as Ethernet or the like. Also, the ports 104 may include some ports operating according to one protocol and others operation according to a different protocol. For example, several of the ports 104 may operate at 10 megabits per second (Mbps) according to Ethernet 10Base-T while the remaining ports operate at 100 Mbps according to Ethernet 100Base-TX. The ports 104 enable connection of the network device 102 to a plurality of other network devices through network segments, such as twisted-pair cables, fiber optic cables, coaxial cables, etc. or even wireless connections as known to those skilled in the art. The other network devices include bridges, switches, repeaters, routers, brouters, etc., or any type of Data Terminal Equipment (DTE) device, which is any source or destination of data including a computer system with a network interface card (NIC) or the like.

The network device 102 is preferably a multiple port bridge or switch, which includes processing logic or a processor 106, port circuitry 108 and memory 110, which includes any combination of non-volatile and programmable memory, such as read only memory (ROM), random access memory (RAM), etc. The processor 106, the port circuitry 108 and the memory 110 may be implemented and coupled in any desired manner. For example, the memory 110 may be a central memory and coupled to both the processor 106 and the port circuitry 108 as desired, or the memory 110 is distributed within the network device 102, such as separate memory modules for the processor 106, the port circuitry 108 and even for any one or more of the individual ports P1-Pn.

The processor 106 generally performs the processing functions and procedures including initialization and configuration of the network switch 102. The processor 106 executes routines stored the memory 110 for performing its various functions. For example, the processor 106 performs the spanning tree functions according to the ANSI/IEEE Std. 802.1D standard, including initialization procedures according to section 4.7.1 and spanning tree configuration according to section 4.8.1. The processor 106 also performs ongoing management functions during operation, including dynamically reconfiguration of virtual LAN (VLAN) definitions according to the present invention as described more fully below. The port circuitry 108 is coupled to each of the ports 104 for controlling packet data flow between the ports 104 and for enabling the processor 106 to control operation of the ports 104 as desired.

The memory 110 includes a programmable VLAN definition section 112 for defining any grouping of the ports 104 as desired. The processor 106 executes routines for assisting a user or system administrator to program the memory 110. As shown in FIG. 1, at least two separate VLANs are defined, including a VLAN V1 150 including ports P1, P2 and P3, and a VLAN V2 152 including ports P4, P5 and P6. Thus, the VLANs V1 and V2 include mutually-exclusive sets of the ports 104. In the preferred embodiment, the VLAN definition section 112 includes a VLAN port mask for each port, where each port mask includes a bit for every port of the network device 102. A bit in the port mask is set to a logic high level (such as logic one) to include the respective port in a VLAN and cleared to a logic low level (such as logic zero) to mask the port. In this manner, each port's port mask defines a VLAN for that port by identifying every other port 104 belonging in the same VLAN group. Of course, each port 104 may be defined as its own VLAN, or all of the ports 104 may be included in one global VLAN.

A network segment 112 couples a DTE device 114 to port P1. A network segment 116 couples a network device 118 to port P2. The network device 118 is preferably a repeater or the like with multiple ports for coupling one or more DTE devices 120, 122 via separate network segments. One port of the repeater 118 is coupled to one port of another network device 126 through a network segment 124. The network device 126 is a bridge, which includes another port coupled to another repeater 130 via a network segment 128. The repeater 130 couples one or more DTE devices 132, 134 through separate network segments, and is coupled to one port of another bridge 138 via a network segment 136. The bridge 138 includes another port coupled to port P6 of the network device 102 via a network segment 140. A DTE device 144 is coupled to port P4 through a network segment 142. The configuration shown in FIG. 1 illustrates a hardware loop between ports P2 and P6 of the network device 102, where the hardware loop includes the devices 118, 126, 130 and 138 and the network segments 116, 124, 128, 136 and 140.

Figure 2:
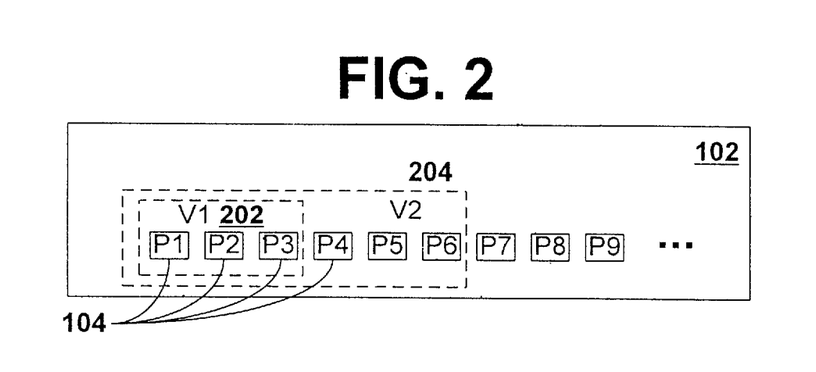
FIG. 2 is a simplified block diagram illustrating the network device of FIG. 1 with a VLAN definition showing a subset VLAN.

FIG. 2 is a simplified block diagram illustrating the network device 102 with a different VLAN definition. In particular, a first VLAN V1 202 includes ports P1, P2 and P3 and a second VLAN V2 204 includes ports P1–P6. In this manner, V1 is a subset of V2. A subset VLAN definition may cause problems if any of the shared ports P1, P2 or P3 are configured as blocking for one VLAN and non-blocking (listening/learning/forwarding) for another. For each port 104 and for each VLAN definition, the network device 102 determines a port status based on user-defined parameters and the results of the spanning tree operation. If a port is blocked, then the network device 102 generally ignores any data packets received at the port and does not send any data packets via that port. A port is set to a listening status mode during configuration to send and receive configuration packets, otherwise known as bridge protocol data units (BPDUs). A port is set to a learning status mode to perform the learning bridge functions of examining and storing network addresses of devices coupled to the port. A port is set to a forwarding mode for sending and receiving data packets.

Figure 3:
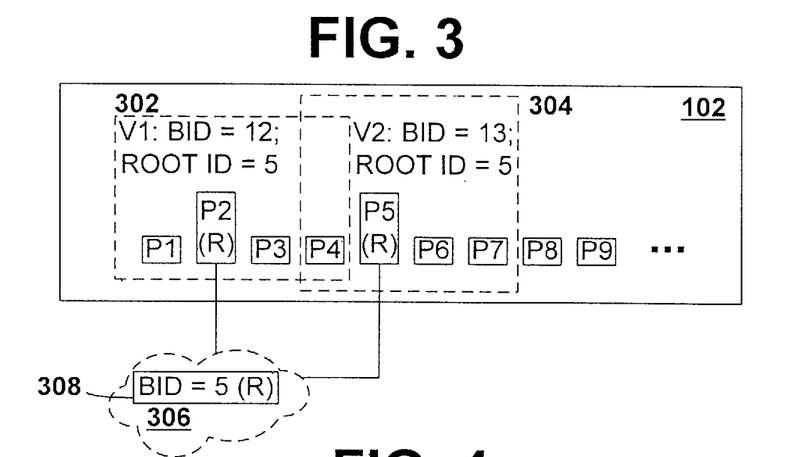
FIG. 3 is a simplified block diagram illustrating the network device of FIG. 1 with a VLAN definition showing VLANs with a shared port and different root ports.

FIG. 3 is another simplified block diagram of the network device 102 with another VLAN definition, where a VLAN V1 302 includes ports P1–P4 and a VLAN V2 304 includes ports P4–P7. In this manner, port P4 is shared between both VLANs V1 and V2. Ports P2 and P5 are coupled to an external network 306, which includes a bridge device 308 with a simplified bridge identifier (ID) of 5. Normally, each bridging device is assigned at least one bridge ID (or BID in the Figures), which is an industry-wide, 48-bit unique address. The network switch 102 has assigned a bridge ID of 12 to VLAN V1 and a bridge ID of 13 to V2. If the bridge ID of 5 of the bridge device 308 is the lowest according to the spanning tree procedure, then the bridge device 308 is the ROOT bridge for the network 306 including the network device 102. Port P2 becomes the ROOT port for the VLAN V1 and port P5 becomes the ROOT port for the VLAN V2 of the network device 102. Since V1 and V2 have a shared port and different root ports, a loop exists across the VLANs V1 and V2, which further causes potential problems, such as duplicate packets, address conflicts, broadcast storms, etc.

Figure 4:
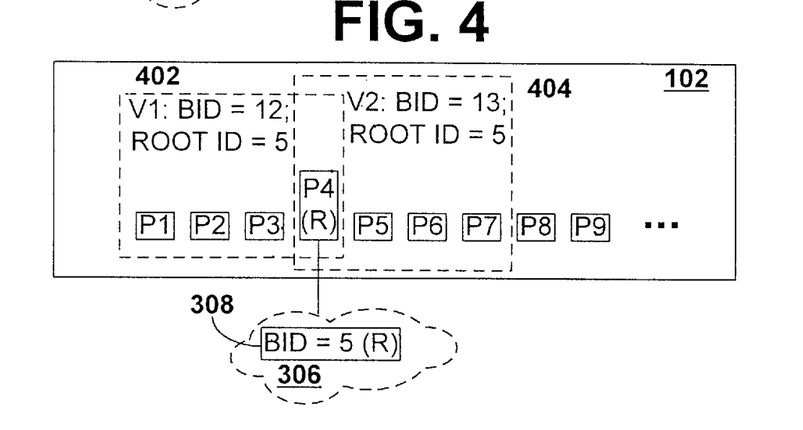
FIG. 4 is a simplified block diagram illustrating the network device of FIG. 1 with a VLAN definition showing VLANs with a shared port and the same root port.

FIG. 4 is another simplified block diagram of the network device 102 with the same VLAN definition shown in FIG. 3, where V1 includes ports P1–P4 and V2 includes ports P4–P7. However, the network system 306 is coupled to the shared port P4. Thus, port P4 becomes the ROOT port for both VLANs V1 and V2.

Figure 5:
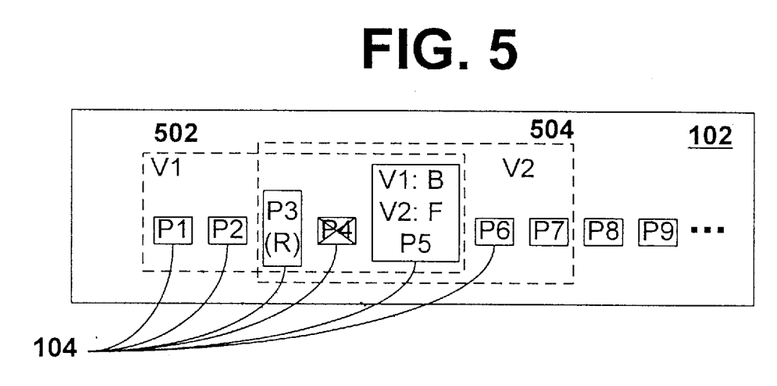
FIG. 5 is a simplified block diagram illustrating the network device of FIG. 1 with a VLAN definition showing VLANs with multiple shared ports, the same root port and one shared port with different status for the VLANs.

FIG. 5 is another simplified block diagram of the network device 102 with another VLAN definition, where a VLAN V1 502 includes ports P1–P5 and a VLAN V2 504 includes ports P3–P7. In this case, the ports P3–P5 are shared among the VLANs V1 and V2. After initialization and configuration, port P3 is determined to be the ROOT port for both V1 and V2. Port P4 is configured as blocking for both V1 and V2 as shown with an "X" symbol therein. However, port P5 is set to blocking for V1 and forwarding for V2. Although it is generally allowed that two or more ports be shared among several VLANs, network problems arise if a shared port is blocking for one VLAN and not blocking for any other one of the sharing VLANs.

Figure 6:
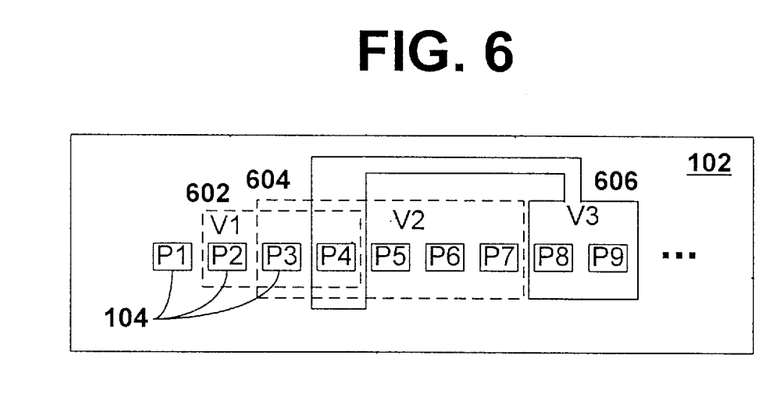
FIG. 6 is a simplified block diagram illustrating the network device of FIG. 1 with a VLAN definition showing multiple VLANs with a shared ports.

FIG. 6 is another simplified block diagram of the network device 102 yet with another VLAN definition, where a VLAN V1 602 includes ports P2–P4, a VLAN V2 604 includes ports P3–P7 and a VLAN V3 606 includes ports P4, P8 and P9. In this manner, port P3 is shared between VLANs V1 and V2, and port P4 is shared between all three VLANs V1–V3. In general, such multiple port sharing is allowed, but may cause problems as previously described with configurations according to the standard spanning tree procedure. For example, address conflict and/or duplicate packet problems arise if port P3 is blocking for V1 and forwarding for V2.

Figure 7:
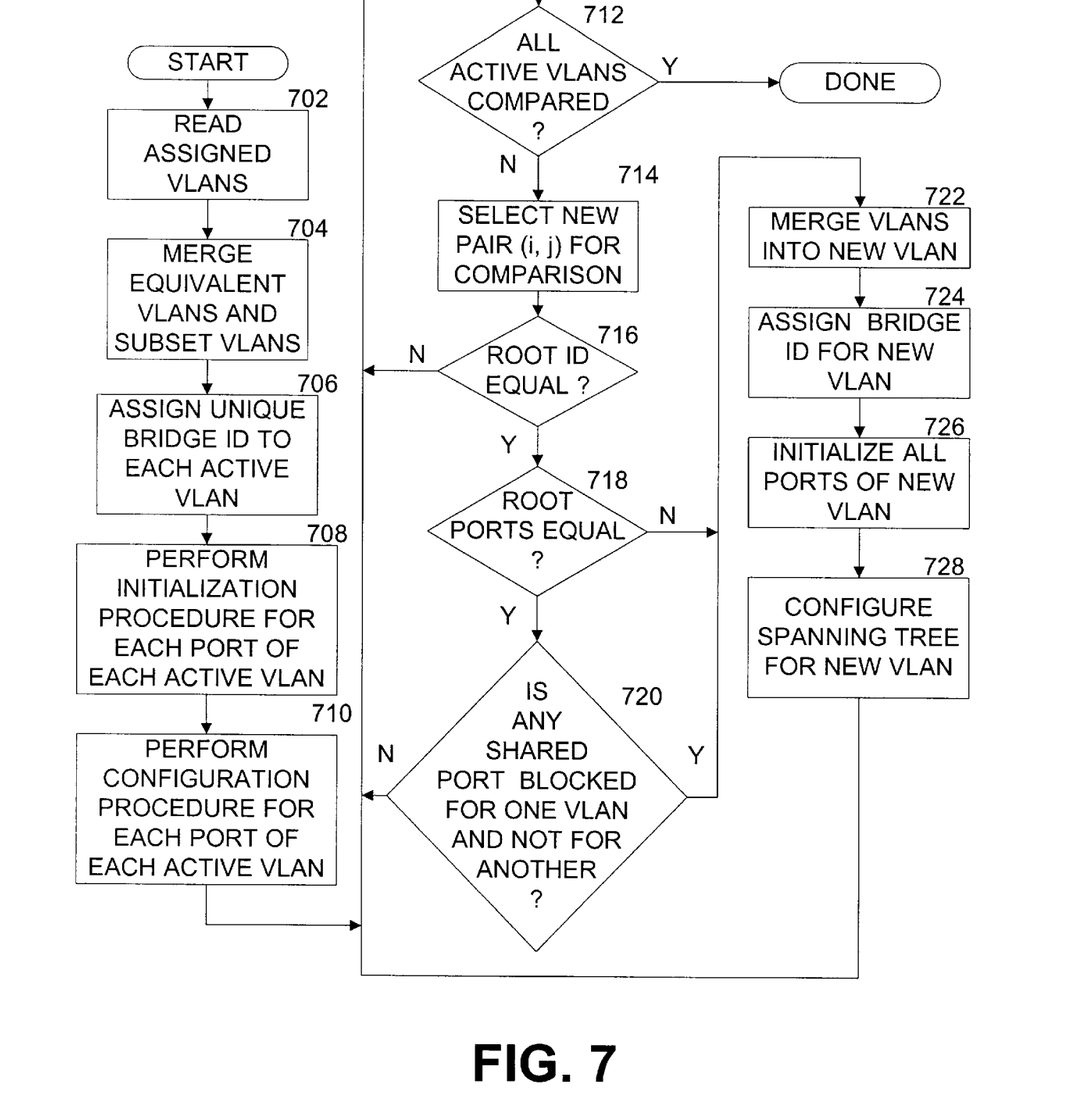
FIG. 7 is a flowchart diagram illustrating a reconfiguration procedure implemented according to the present invention.

FIG. 7 is a flowchart diagram illustrating a reconfiguration procedure performed by the network device 102 to overcome any of the VLAN configuration problems described above. The reconfiguration procedure modifies the user-defined VLAN definitions, as performed by the processor 106, the port circuitry 108, or any combination thereof. At a first step 702, the VLAN assignments are read from the memory 110, such as defined in the VLAN definition section 112. At next step 704, any equivalent VLANs are merged together, where equivalent VLANs are those having the same port assignments. Also, any subset VLANs are Merged together with their corresponding superset VLANs. Two VLANs Vi and Vj are merged according to the following equations (1) and (2):

$$Vi'(fwd(mask)):=Vi(fwdmask) \text{ OR } Vj \text{ (fwdmask)} \quad (1)$$

$$Vj'(fdmask):=Vj(fwdmask) \text{ OR } Vi \text{ (fwdmask)} \quad (2)$$

where fwdmask denotes the port mask of the indicated VLAN, the VLANs Vi' and Vj' are the "new" VLAN definitions, the ":=" operator means "set equal to", and the "OR" operator is the logic OR bit-wise operation. As indicated by the equations (1) and (2), the new VLAN definitions are the same for both new VLANs, and includes a superset of the ports of the original VLAN definitions. Once merged, only one of the VLAN assignments is active and used for purposes of determining the spanning tree, while the other VLAN definition is kept in the management information base (MIB) of the network device 102 for management purposes, but is not used for purposes of determining the spanning tree. The port mask assignments of each of the affected ports is modified in the VLAN definitions 112, where the new VLAN port mask definition is used for each affected and included port. It is also noted that the original VLAN definitions are also kept for purposes of network management.

Using FIG. 2 as an example, V1 has a port mask fwd mask=000007 h (where "h" denotes hexadecimal notation) and V2 has a port mask fwdmask=00003 Fh. After the merge operation, the port masks for both of the new VLANs V1' and V2' is fwdmask=00003 Fh. The new port mask definition V1' is active and used for purposes of the spanning tree, and the "new" port mask definition for V2' is kept for purposes of management, marked as a merged VLAN, but is not active and thus is not used for determining the spanning tree. The port masks for each of the ports P1–P6 are also set equal to the new fwdmask=00003 Fh.

At next step 706, the network device 102 assigns a unique bridge ID for each active VLAN. At next step 708, each port of each active VLAN is initialized according to the spanning tree initialization procedure as defined in section 4.8.1 of ANSI/IEEE Std. 802.1D. At next step 710, the spanning tree configuration procedure as defined in section 4.7.1 of ANSI/IEEE Std. 802.1D is performed for each port of each active VLAN. After the configuration procedure according to the standard spanning tree procedure, each VLAN has been assigned a root identifier (ROOT ID) and a ROOT port. For example, as shown in FIG. 3, the VLAN V1 is assigned a ROOT ID of 5 and port 2 is its ROOT port, and the VLAN V2 is assigned a ROOT ID of 5 and port 5 is its ROOT port.

At next steps 712 and 714, each active VLAN is compared with every other VLAN to identify any potential network problems as previously described. Any problematic pair of VLANs are merged into a new VLAN definition as described below, and the new VLAN is then compared with every remaining VLAN until all remaining and active VLANs have been tested and configured. At step 714, a new pair of active VLANs are selected. At next step 716, the ROOT ID of the selected VLANs are compared. If the ROOT IDs of the selected pair are not equal, operation returns to step 712 to select another pair of active VLANs. In the case of unequal ROOT IDs, the two VLANs are not linked together and contains no problematic loops, and thus the spanning tree is satisfactory. If, however, the ROOT IDs of the selected pair are equal, operation proceeds to step 718, where it is queried whether the ROOT ports of the selected pair are equal. If the ROOT IDs of the selected pair are equal but the ROOT ports are not, as illustrated in FIG. 3, operation proceeds to step 722 to merge the two VLANs.

Figure 8:
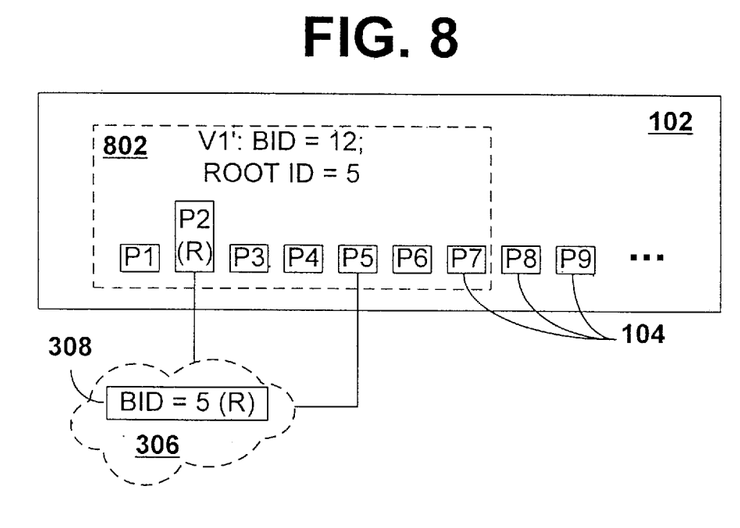
FIG. 8 is a simplified block diagram illustrating the network device of FIG. 1 with the original VLAN definitions of FIG. 3 merged into a new VLAN definition.

The equations (1) and (2) provided above are used to merge the two VLANs in step 722. For example, as shown in FIG. 3, the VLAN V1 has a port mask fwd mask=00000 Fh and the VLAN V2 has a port mask fwd mask=000078 h. Each of the new VLANs V1' and V2' have a new port mask fwdmask=00007 Fh as a result of the merge operation. As described above, the VLAN V1' is selected for continued spanning tree operations and the VLAN V2' is marked as merged and not used. The port mask definitions for each of the ports P1–P7 are modified and set equal to 00007 Fh, and the resulting VLAN V1' 802 is shown in FIG. 8. At next step 724, a bridge ID is assigned for the new VLAN V1', which may be a completely new bridge ID or one of the bridge IDs assigned to the original VLANs V1 and V2. As shown in FIG. 8, the new VLAN V1' is assigned the bridge ID=12 of the original VLAN V1. At next step 726, all of the ports of the new VLAN are initialized in a similar manner as described for step 708, and the spanning tree configuration for the new VLAN is performed in a similar manner as described for step 710.

Figure 9:
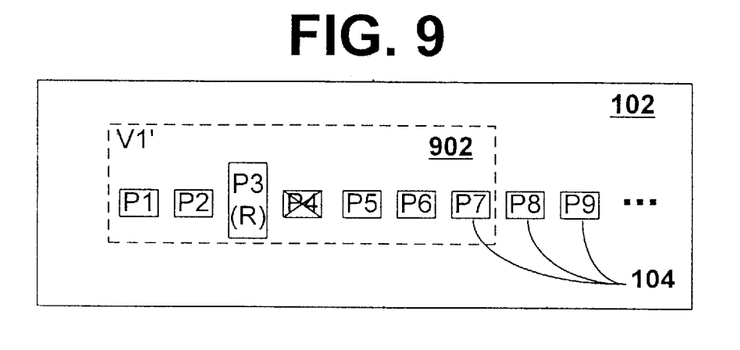
FIG. 9 is a simplified block diagram illustrating the network device of FIG. 1 with the original VLAN definitions of FIG. 5 merged into a new VLAN definition.

As shown in FIG. 8, the new configuration for the new VLAN V1' results in one of the ROOT ports to be selected as the ROOT port for the new VLAN V1' 802, since only one ROOT port may be selected for any given VLAN. From step 728, operation returns to step 712 to compare another pair of VLANs, where the new VLAN is also eventually compared with every other VLAN. Referring back to step 718, if the ROOT IDs and the ROOT ports are equal, such as shown in FIGS. 4 and 5, operation proceeds to step 720. At step 720, it is queried whether any shared port is blocked for one VLAN and not for any other VLAN. If not, such as shown in FIG. 4, then operation returns to step 712 to select another pair of VLANs for comparison. If, however, a shared port is blocked for one VLAN and not for another, such as the port P5 of the configuration shown in FIG. 5, then operation proceeds to step 722 to merge the VLANs. For example, in FIG. 5, the port P5 is blocked for VLAN V1 but is in the forwarding state for the VLAN V2. In this case, the VLANs V1 and V2 are merged resulting in a new VLAN V1' 902, as shown in FIG. 9. After the initialization and configuration steps 726, 728 are performed, the ROOT port is likely to remain the same depending upon the bridge ID assigned to the new VLAN. The port originally having different status settings for different VLANs, which was the port P5 in FIG. 5, is given a new status setting, such as forwarding, blocking, etc., for the new VLAN V1' shown in FIG. 9.

After all of the active VLANs and newly merged VLANs have been compared as determined in step 712, operation is complete for the original VLAN definition. In one embodiment, however, the VLAN definition may be modified during operation. If the VLAN definitions are reconfigured during operation, the procedure shown in FIG. 7 is repeated for each new VLAN defined, and for each new VLAN as a result of merged VLANs, if any.

A bridge MIB (RFC 1493) for the network device 102 may be extended for management purposes as desired. The bridge MIB is preferably stored in the memory 110. The MIB extensions enables a user or network administrator to determine merged VLANs and reconfigure the VLAN definitions or make hardware modifications as desired. An example of possible MIB extensions are as follows:

1. dot1dBase group base extensions, which include the bridge address, number of ports present in the bridge etc.
2. dot1dStp group extensions to cover all the virtual bridges and their spanning trees.
3. dot1dTp group for each virtual bridge
4. dot1dStatic group extensions if Static addresses have to be configured on a VLAN basis.

An example VLAN Management MIB is as follows:

VLAN Config Table

This table is used to statically configure N VLANs at initialization. The vlanPortConfigTable is then used to add/delete ports to this VLAN.

```
vlanConfigTable     OBJECT-TYPE
   SYNTAX              SEQUENCE OF vlanConfigEntry
   ACCESS              not-accessible
   STATUS              mandatory
   DESCRIPTION
   "A table containing a list of VLANS configured for this
   device."
   ::= { vlanConfigConfig 2 }
vlanConfigEntry    OBJECT-TYPE
   SYNTAX              VlanConfigEntry
   ACCESS              not-accessible
   STATUS              mandatory
   DESCRIPTION
   "A list of VLANs, their Ids etc."
   INDEX { vlanConfigIndex }
   ::= { vlanConfigTable 1 }
VlanConfigEntry ::= SEQUENCE {
   vlanIfIndex                      INTEGER,
   vlanConfigBridgeAddress          MacAddress,
   vlanConfigNumofEntries           INTEGER,
   vlanConfigReconfigStatus         INTEGER,
```

```
            vlanConfigReconfigCookie      INTEGER,
            vlanConfigName         DisplayString
            }
        vlanIndex      OBJECT-TYPE
            SYNTAX                 INTEGER
            ACCESS                 read-only
            STATUS                 mandatory
            DESCRIPTION
            "The unique identifier for this VLAN configuration
            entry."
            ::= { vlanConfigEntry 1 }
        vlanConfigBridgeAddress    OBJECT-TYPE
            SYNTAX                 MacAddress
            ACCESS                 read-only
            STATUS                 mandatory
            DESCRIPTION
            " The MAC address that is used by this VLAN. It is taken
            from the pool of addresses available for the bridge. "
            ::= { vlanConfigEntry 2 }
        vlanConfigNumofEntries     OBJECT-TYPE
            SYNTAX                 INTEGER
            ACCESS                 read-only
            STATUS                 mandatory
            DESCRIPTION
            " The total number of ports configured for this VLAN.
            Please note that this number includes only number of
            ports configured by the user. If VLANs are merged, the
            total number of ports present in a VLAN will be different
            from this number "
            ::= { vlanConfigEntry 3 }
        vlanConfigReconfigStatus   OBJECT-TYPE
            SYNTAX                 INTEGER{
                                   userDefined(1),
                                   reconfigured(2)
                                   }
            ACCESS                 read-only
            STATUS                 mandatory
            DESCRIPTION
            " This Object indicates if VLAN merging has occurred. If
            the value of this object is reconfigured(2), then the
            vlanConfigReconfigCookie provides a unique means of
            identifying all VLAN entries that have been merged"
            ::= { vlanConfigEntry 4 }
        vlanConfigReconfigCookie   OBJECT-TYPE
            SYNTAX                 INTEGER
            ACCESS                 read-only
            STATUS                 mandatory
            DESCRIPTION
            " A unique value that identifies all VLAN entries that
            have been merged "
            ::= { vlanConfigEntry 5 }
        vlanConfigName             OBJECT-TYPE
            SYNTAX                 DisplayString
            ACCESS                 read-write
            STATUS                 mandatory
            DESCRIPTION
            " A textual description field for this VLAN. "
            ::= { vlanConfigEntry 6 }
        vlanPortConfigTable        OBJECT-TYPE
            SYNTAX                 SEQUENCE OF vlanPortConfigEntry
            ACCESS                 not-accessible
            STATUS                 mandatory
            DESCRIPTION
            "A table containing a list of ports configured for a
            VLAN."
            ::= { vlanConfig 2 }
        vlanPortConfigEntry        OBJECT-TYPE
            SYNTAX                 VlanPortConfigEntry
            ACCESS                 not-accessible
            STATUS                 mandatory
            DESCRIPTION
            "A list of ports, their Ids etc."
            INDEX { vlanPortVlanIndex, vlanPortIndex }
            ::= { vlanConfigTable 1 }
        -- VLAN Port Config Table
        -- This table is used to add/remove ports from a VLAN
        VlanPortConfigEntry ::= SEQUENCE {
            vlanPortVlanIndex              INTEGER,
            vlanPortIndex                  INTEGER,
            vlanPortName                   DisplayString,
            vlanPortConfigStatus           EntryStatus
            }
        vlanPortVlanIndex      OBJECT-TYPE
            SYNTAX                 INTEGER
            ACCESS                 read-only
            STATUS                 mandatory
            DESCRIPTION
            "The index of the VLAN. This value is the same as the
            value of vlanIndex in the vlanConfigTable."
            ::= { vlanPortConfigEntry 1 }
        vlanPortIndex          OBJECT-TYPE
            SYNTAX                 INTEGER
            ACCESS                 read-only
            STATUS                 mandatory
            DESCRIPTION
            "The port number of the port that is a member of this
            VLAN. This value should be the same as the if Index value
            for this interface"
            ::= { vlanPortConfigEntry 2 }
        vlanPortName           OBJECT-TYPE
            SYNTAX                 DisplayString
            ACCESS                 read-write
            STATUS                 mandatory
            DESCRIPTION
            " A textual description place-holder for this port. "
            ::= { vlanPortConfigEntry 3 }
        vlanPortConfigStatus       OBJECT-TYPE
            SYNTAX                 EntryStatus
            ACCESS                 read-write
            STATUS                 mandatory
            DESCRIPTION
            "The row control mechanism for this entry. "
            ::= { vlanPortConfigEntry 4}
        -- Reset Reconfiguration
        -- Starts reinitialization of All VLANs whose port masks have
        merged
        vlanConfigResetReconfig    OBJECT-TYPE
            SYNTAX                 INTEGER{
                                   invalid (1),
                                   reset (2)
                                   }
            ACCESS                 read-write
            STATUS                 mandatory
            DESCRIPTION
            "Setting this value to reset(2) will restart spanning
            tree process on all merged VLANS. "
            ::= { vlanConfig 3 }
        -- Traps
        vlanConfigReconfig     TRAP-TYPE
            ENTERPRISE                     vlanConfig
            VARIABLES                      {vlanConfigReconfigCookie,
                                           vlanIfIndex(first),
                                           vlanIfIndex(second)....}
            DESCRIPTION
            "A vlanConfigReconfig TRAP is sent to the management
            station when the bridge reconfigures the port masks after
            it detects a VLAN misconfiguration"
            ::= 1
```

It is now appreciated that a method and apparatus for dynamically reconfiguring virtual LANs of a network device prevents network problems, such as looping data packets, address conflicts and/or broadcast storms, caused by particular VLAN definitions and/or hardware configuration. Equivalent and subset VLANs are first combined since they could potentially cause network problems. The spanning tree procedure is then performed, including initialization and configuration. After the initial spanning tree procedure is performed, the VLANs are compared to identify problematic configurations. Mutually-exclusive VLANs with the same root identifier have been connected together externally forming a loop, so that the VLANs are merged. VLANs with shared ports having different root ports are also merged. VLANs with shared ports and the same root port are merged if any shared port is blocking for one VLAN and not the other. Such VLAN merging prevents network problems that are not addressed by the spanning tree procedure because of overlapping VLAN definitions and/or hardware configurations. Also, VLAN merging results in a working network without introducing new problems.

Although a system and method according to the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

I claim:

1. A method of configuring virtual LANs of a multiple port device, comprising the steps of:

predefining a plurality of virtual LANs by grouping ports together for each predefined virtual LAN;

performing a spanning tree procedure to determine a root identifier and a root port for each virtual LAN;

comparing the root identifier of each virtual LAN with at least one other virtual LAN;

if the root identifiers of any two virtual LANs are equal, comparing the root ports of the two virtual LANs; and if the root identifiers are the same and if the root ports are different for any two virtual LANs, merging the two virtual LANs into a new virtual LAN.

2. The method of claim 1, wherein said step of merging comprises the step of combining all of the ports of the two virtual LANs to form the new virtual LAN.

3. The method of claim 1, prior to said step of performing a spanning tree procedure, further comprising the step of:

merging any predefined virtual LANs that are equivalent; and merging any predefined virtual LANs that is a subset of a larger virtual LAN with the larger virtual LAN.

4. The method of claim 1, after said step of merging, further comprising the step of:

performing a spanning tree procedure for the new virtual LAN.

5. The method of claim 4, further comprising the steps of:

comparing the root identifier of the new virtual LAN with at least one other virtual LAN;

if the root identifier of the new virtual LAN is the same as the root identifier of any other virtual LAN, comparing the root ports of the two virtual LANs; and if the root identifiers are the same and if the root ports are different for the two virtual LANs, merging the two virtual LANs into another new virtual LAN.

6. The method of claim 4, further comprising the steps of:

comparing the root identifier of the new virtual LAN with at least one other virtual LAN;

if the root identifier of the new virtual LAN is the same as the root identifier of any other virtual LAN, comparing the root ports of the two virtual LANs;

if the root identifiers and the root ports are the same for the two virtual LANs, determining if any shared port of the two virtual LANs is blocked for one of the two virtual LANs and not the other; and if a shared port of the two virtual LANs is blocked for one of the two virtual LANs and not the other, merging the two virtual LANs into another new virtual LAN.

7. The method of claim 1, further comprising the steps of:

if the root identifiers and the root ports are the same for any two virtual LANs, determining if any shared port of the two virtual LANs is blocked for one of the two virtual LANs and not the other; and if a shared port of the two virtual LANs is blocked for one of the two virtual LANs and not the other, merging the two virtual LANs into a new virtual LAN.

8. A network device, comprising:

a plurality of ports;

a virtual LAN definition circuit that defines a plurality of virtual LANs of said plurality of ports;

spanning tree circuitry coupled to said virtual LAN definition circuit that determines a spanning tree definition for each of said plurality of virtual LANs including determination of a root identifier and a root port; and processing circuitry coupled to said spanning tree circuitry and said virtual LAN definition circuit that compares said spanning tree definition of each of said plurality of virtual LANs with at least one other of said plurality of virtual LANs, and that merges any two virtual LANs if said root identifier of both of said any two virtual LANs are the same and if said root port of both of said two virtual LANs are not the same.

9. The network device of claim 8, further comprising:

said processing circuitry further merges said any two virtual LANs if said root identifier and said root port of both of said any two virtual LANs are the same and if a shared port between said any two virtual LANs is blocking for one and not blocking for the other.

10. The network device of claim 8, further comprising:

said processing circuitry merging said any two virtual LANs by determining a new virtual LAN that includes all the ports of both of said any two virtual LANs.

11. The network device of claim 8, wherein said spanning tree circuitry comprises:

a processor;

memory coupled to said processor; and port circuitry coupled to said processor.

12. The network device of claim 8, wherein said processing circuitry comprises a processor coupled to memory.

13. The network device of claims 8, wherein said processing circuitry operates the network device as a network switch.

14. A network system, comprising:

a multiple port device, comprising:

a plurality of ports;

a virtual LAN definition circuit that defines a plurality of virtual LANs of said plurality of ports;

spanning tree circuitry coupled to said virtual LAN definition circuit that determines a spanning tree definition for each of said plurality of virtual LANs including determination of a root identifier and a root port; and processing circuitry coupled to said spanning tree circuitry and said virtual LAN definition circuit that compares said spanning tree definition of each of said plurality of virtual LANs with at least one other of said plurality of virtual LANs, and that merges any two virtual LANs if said root identifiers of both of said any two virtual LANs are the same and if said root ports of both of said two virtual LANs are not the same and if said root identifiers and said root ports of both of said any two virtual LANs are the same and if a shared port between said any two virtual LANs is blocking for one and not blocking for the other; and a plurality of network devices coupled to said multiple port device through at least one of said plurality of ports.

* * * * *